W. H. & L. H. HALL.
POT HANDLE.
APPLICATION FILED AUG. 11, 1910.
1,015,176.
Patented Jan. 16, 1912.
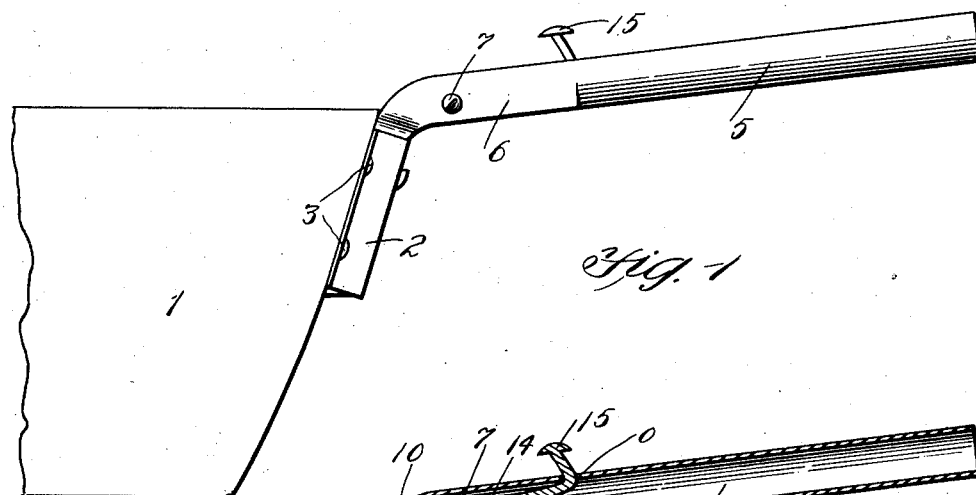
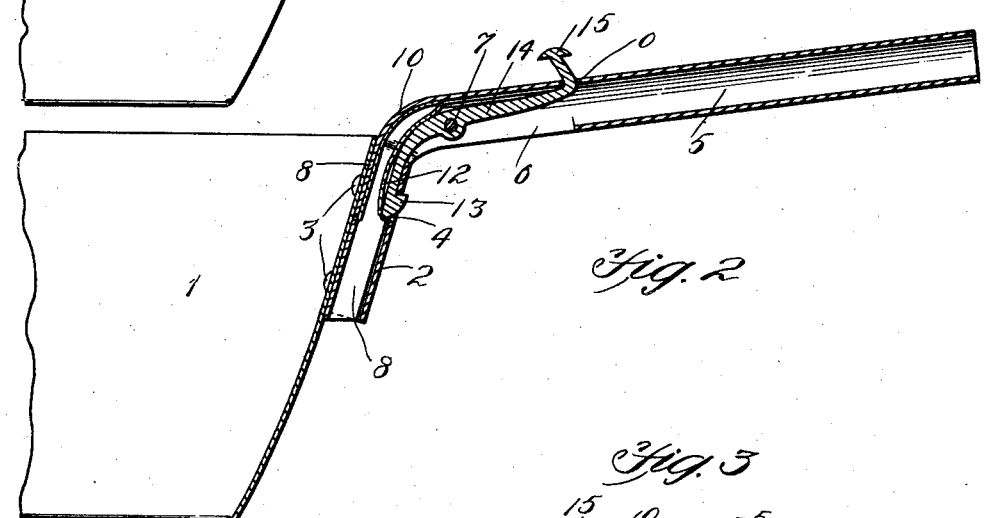
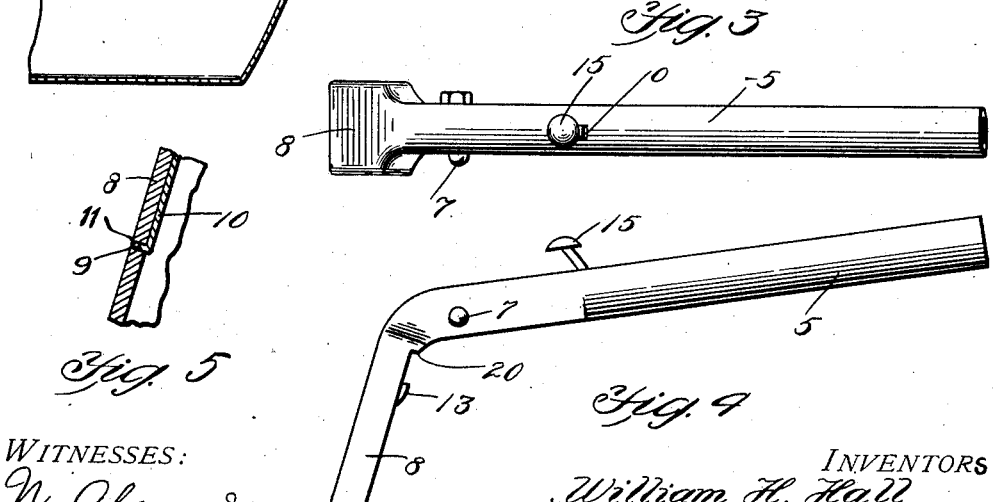
WITNESSES:
N. Abramson
Joe. P. Wahler
INVENTORS
William H. Hall
and Lewis H. Hall
By Geo. W. Sues.
Attorney
COLUMBIA PLANOGRAPH CO., WASHINGTON, D. C.

UNITED STATES PATENT OFFICE.

WILLIAM H. HALL AND LOUIS H. HALL, OF WINLOCK, WASHINGTON.

POT-HANDLE.

1,015,176. Specification of Letters Patent. Patented Jan. 16, 1912.

Application filed August 11, 1910. Serial No. 576,735.

*To all whom it may concern:*

Be it known that we, WILLIAM H. HALL and LOUIS H. HALL, citizens of the United States, and residents of Winlock, in the county of Lewis and State of Washington, have invented certain new and useful Improvements in Pot-Handles, of which the following is a specification, reference being had to the accompanying drawings.

The present invention relates to certain new and useful improvements in the construction of handles for pots or similar utensils, the primary object of the invention being the provision of a pot handle which embodies novel features of construction whereby it may be quickly attached or detached from a pot or the like.

A further object of the invention is to provide a detachable pot handle which is comparatively simple and inexpensive in its construction, which is held rigidly in position when applied to the pot or kettle, and which is light in weight and can be packed in a comparatively small amount of space.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification, and in which like numerals of reference indicate similar parts in the several views:—Figure 1, is a side elevational view, showing a fragmentary portion of a pot to which one of our improved handles is shown as connected. Fig. 2, is a central sectional view of Fig. 1. Fig. 3, is a top view of the handle detent. Fig. 4, shows a detached side elevational view of the handle. Fig. 5, shows a fragmentary portion of a handle head, disclosing the method of securing the spring.

Specifically describing the present embodiment of the invention, the numeral 1 designates the body portion of a pot or kettle. A keeper 2 is applied to one side of the pot 1 at a point toward the top thereof. This keeper may be formed in any suitable manner, although it is preferably constructed of sheet metal which is suitably bent into shape, the sides of the keeper being formed with outwardly extending flanges which are secured to the pot by some suitable fastening members such as the rivets 3.

The handle 5 has a hollow or tubular formation and is provided at one end thereof with a laterally extending arm 8, the said arm and handle being connected by the curved neck 10. The body portion of the handle 5 is shown as circular in cross section, while the lateral arm 8 is substantially rectangular in cross section so as to fit closely within the keeper 2. The outer side of the lateral arm 8 is preferably open, and the lower side of the handle 5 is also open at the inner end thereof, as indicated at 6. A transverse bolt or pin 7 connects the sides of the handle at the inner end thereof and a curved lever 14 is pivotally mounted at a point between its ends upon this pin. One arm of the lever 14 extends forwardly into the tubular handle and has the extremity thereof extended upwardly so as to pass loosely through an opening O in the top of the handle, the said upturned extremity terminating in a finger piece 15. The opposite arm of the lever 14 extends downwardly into the lateral arm 8 and terminates in a nose 13 adapted to engage an opening 4 in the back of the keeper.

An inverted V-shaped spring strip 12 is arranged between the last mentioned arm of the lever 14 and the closed side of the lateral arm 8, one end of the spring bearing against the lever so as to normally tend to throw the nose 13 into an operative position, while the opposite end of the spring has the extremity thereof extended laterally at 9 and secured within an opening or socket 11 formed in the lateral arm.

A shoulder 20 is provided at the upper end of the lateral arm 8 and when applying the handle to the pot or kettle, the lateral arm 8 is slipped into the keeper until the shoulder 20 abuts against the upper edge thereof. In the act of inserting the lateral arm within the keeper the inclined end of the nose 13 of the lever coöperates with the end of the keeper to force the nose inwardly against the action of the spring 12. However, as soon as the shoulder 20 abuts against the keeper, the nose 13 is forced into the opening 4 by means of the spring 12, the said nose and shoulder coöperating with each other to hold the handle rigidly in position and prevent any play of the lateral arm within the keeper. In order to detach the handle it is merely necessary to press downwardly upon the finger piece 15 so as to swing the lever 14 about the pin 7 as a pivot and retract the nose 13 into an inoperative position. The lateral arm 8 will then slide freely out of the keeper and the pot and handle may be packed separately or otherwise provided for as may be desired.

Having thus described our said invention what we claim as new and desire to secure by United States Letters Patent, is:—

The combination of a pot, a keeper projecting from the pot and having an opening therein, a hollow handle having an opening in the top thereof and provided at one end thereof with a laterally projecting arm adapted to be received within the keeper, a shoulder being provided upon the arm for engagement with the end of the keeper and the lateral arm being hollow and having the rear side thereof open, a transverse pin extending across the interior of the handle at a point toward the inner end thereof, a curved lever pivotally mounted at an intermediate point in its length upon the said transverse pin, one end of the lever extending forwardly into the hollow handle and having the extremity thereof deflected upwardly so as to pass loosely through the opening in the handle, while the opposite end of the curved lever extends downwardly into the lateral arm and is provided with a nose adapted to enter the before mentioned opening of the keeper and coöperate with the before mentioned shoulder of the arm to hold the handle securely in position, and a spring arranged within the lateral arm so as to bear against the back of the lever and tend to normally throw the nose thereof into an operative position.

In testimony whereof, we affix our signatures, in presence of two witnesses.

WILLIAM H. HALL.
LOUIS H. HALL.

Witnesses:
  F. C. SCHAEFER,
  OTTO WECHERT.

---

Copies of this patent may be obtained for five cents each, by addressing the "Commissioner of Patents, Washington, D. C."